United States Patent
Cato et al.

(10) Patent No.: US 7,789,304 B2
(45) Date of Patent: Sep. 7, 2010

(54) CHILD LOCK FOR ELECTRONIC DEVICE

(75) Inventors: Robert T. Cato, Raleigh, NC (US);
Thomas J. Sluchak, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1055 days.

(21) Appl. No.: 11/464,916

(22) Filed: Aug. 16, 2006

(65) Prior Publication Data

US 2008/0059880 A1    Mar. 6, 2008

(51) Int. Cl.
*G06K 15/00* (2006.01)
*G06K 7/10* (2006.01)

(52) U.S. Cl. .................. 235/383; 235/472.01

(58) Field of Classification Search ................
235/472.01–472.03, 383; 455/566
See application file for complete search history.

(56) References Cited

U.S. PATENT DOCUMENTS

| 4,071,740 A * | 1/1978 | Gogulski ................ 235/431 |
|---|---|---|
| 5,250,798 A | 10/1993 | Johnson |
| 5,361,871 A | 11/1994 | Gupta et al. |
| 5,821,513 A | 10/1998 | O'Hagan et al. |
| 5,979,757 A | 11/1999 | Tracy et al. |
| 6,024,281 A | 2/2000 | Shepley |
| 6,484,939 B1 | 11/2002 | Blaeuer |
| D482,172 S | 11/2003 | Johnson et al. |
| 2002/0084323 A1 | 7/2002 | Benyak |
| 2002/0194075 A1 | 12/2002 | O'Hagan et al. |
| 2003/0233280 A1 * | 12/2003 | Haulk et al. ............... 705/22 |
| 2005/0079896 A1 * | 4/2005 | Kokko et al. ............. 455/566 |
| 2005/0138415 A1 * | 6/2005 | Russell et al. ........... 713/201 |
| 2005/0253817 A1 * | 11/2005 | Rytivaara et al. ......... 345/173 |
| 2007/0215018 A1 * | 9/2007 | Faries et al. ............... 109/23 |

* cited by examiner

*Primary Examiner*—Jamara A Franklin
(74) *Attorney, Agent, or Firm*—Cantor Colburn LLP; Jason O. Piche

(57) ABSTRACT

A method for controlling a display device, such as, for example, the display device mounted on a shopping cart, the shopping cart having a wheeled base and a basket portion in connection with the wheeled base and a handle in connection with the wheeled base, the method comprising: allowing a user to enter information at and obtain information from the display device; and providing a locking mechanism located on or implemented within the device for permitting the user to activate or deactivate the display device in order to prevent unauthorized access.

3 Claims, 1 Drawing Sheet

CHILD LOCK FOR ELECTRONIC DEVICE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to an electronic device, particularly a consumer information device (CID), and particularly to a CID mounted on a shopping cart that has a controllable child lock. The invention also relates to any electronic consumer device such as, for example, a television or universal remote control.

2. Description of Background

Consumers can now use shopping cart consoles for the input and display of consumer product information. The consoles are built as a handle of the shopping cart or as a device to be retrofitted onto existing handles. The consoles are oriented on the handle of the shopping cart so that the consumer can readily view the displayed information from his or her position behind the cart. The consoles may have a keyboard or touch screen means for the consumer to input product information directly into a computer contained within or accessed remotely by the consoles. In addition, the consoles may be equipped with a bar code scanner in order for the consumer to input product identification information, which then can enable retrieval of other product or pricing data in the computer memory. Such an apparatus and associated computer hardware allows the consumer to input information into a computer and to retrieve data for review on the console display associated with the computer.

The use of a shopping cart so equipped with an information display monitor and a data input device makes it easier and more convenient for the consumer to process information related to goods at a store. Placing a display monitor and associated data input devices on the handle of a shopping cart allows such devices to be in close proximity to the consumer's hands and at a point where the consumer's eyes easily make contact with the display. The use of advertising space in connection with the display also adds a benefit to owners of stores and to suppliers of consumer products to the stores.

The output display may be any state of the art means and may include for example: a Liquid Crystal Display (LCD), a Light Emitting Diode (LED) or a Cathode Ray Tube (CRT) video monitor. Such output may include advertising or sales announcements. Some space on the console may be dedicated to an advertising or display panel that promotes store products. A separate video monitor may also provide advertising information related to other products in the store. Such information may be sent to the console by means of a transmitter at some location, perhaps in the store or at a central location. A broadcast signal receiver located in the console would receive such broadcasted data. Such broadcast data may then be output on the video display in order to alert the consumer concerning store information.

In general, consumer information devices (CID) are used by parents of small children as the child and the parents move through a store. In conventional shopping carts with CID systems, the CID is mounted on shopping carts, near the cart's handle and also near the child's seat. A child seated in the child seat has access to the touch screen and the buttons of the CID, and any other features presented on the CID. When the parent steps away from the CID, for example, in order to pick up an item off a shelf in the store, the child is in a position to tamper with the CID. When the parent steps several feet away from the cart to look at or retrieve an item, it is even more likely that the child could tamper with the CID without the parent being able to prevent it. If a touch screen or buttons on the CID are touched or pressed during the child's tampering, the state of the display may have changed. The tampering may alter or even invalidate a consumer's session or transaction and frustrate the consumer, in this case, the parent.

Thus, it is understood that, as a consequence of the child's proximity to the CID, a child may be fully capable of tampering with a CID mounted in the handle portion of a shopping cart. The child's tampering may cause the parent to become frustrated and could potentially invalidate the consumer's session or transaction. As the parent shops, the parent may have trouble preventing the child from tampering with the CID while the parent is standing near the cart or when momentarily away from the cart. Therefore, it is desired to develop a method for allowing the parent consumer to activate and deactivate the CID whenever desired.

An analogous scenario might involve a consumer parent in a household using a CID such as, for example, a universal remote control to program or configure a television or a device that permits interaction with an advanced function television. The CID device in this instance would be handheld and might consist of a display monitor showing information to the consumer and some form of touch activation on the display screen. A child in close proximity to the device, either while the CID is in the hands of the parent or when the CID is momentarily set aside, could reach out, tamper with the CID and alter or invalidate the consumer parent's previous selections. Thus, in the present household scenario, it is also desired to develop a method for allowing the consumer parent to activate and deactivate the CID whenever desired.

SUMMARY OF THE INVENTION

The shortcomings of the prior art are overcome and additional advantages are provided through the provision of a method for controlling a display device, the display device mounted on a shopping cart, the shopping cart having a wheeled base and a basket portion in connection with the wheeled base and a handle in connection with the wheeled base, the method comprising: allowing a user to enter information at and obtain information from the display device; and providing a locking mechanism located on a housing of the display device for permitting the user to activate or deactivate the display device in order to prevent the altering or invalidating of information entered by the user and information provided to the user.

The shortcomings of the prior art are overcome and additional advantages are provided through the provision of a system for controlling a display device, the display device being handheld or portable, the system comprising: a network; and a host system in communication with the network, the host system including software to implement a method comprising: allowing a user to enter information at and obtain information from the display device; and providing a locking mechanism located on a housing of the display device for permitting the user to activate or deactivate the display device in order to prevent altering or invalidating of information entered by the user and information provided to the user.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution that provides for an efficient parent controllable child lock that, when activated, makes the CID unresponsive to any input.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
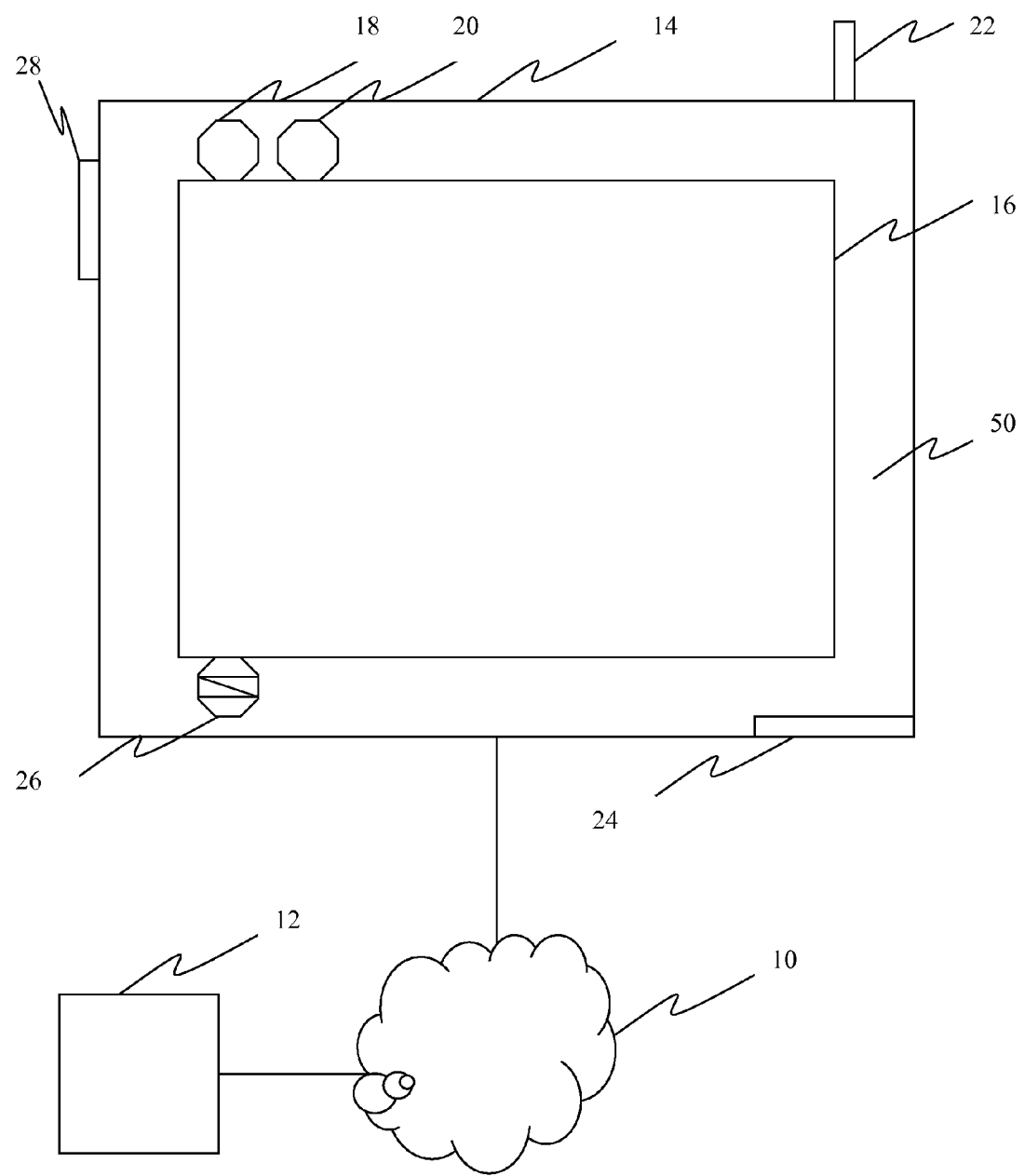
FIG. 1 illustrates one example of a display monitor having an activation/deactivation function mounted on a housing of the display monitor.

One aspect of the exemplary embodiments is a method for deactivating a consumer point of service device mounted on a handle portion of a shopping cart.

A consumer information device (CID) 50 in accordance with a preferred aspect of the exemplary embodiments is represented in FIG. 1. The system of FIG. 1 includes a CID device 50, a network 10, and a host computer 12. The CID device 50 includes a housing 14, a display screen 16, an off button 18, an on button 20, an antenna 22, an optional printer 24, a speaker 26, and an activation/deactivation button 28. In an alternative embodiment, the off button 18 and the on button 20 may be merged into a single on/off button (not shown).

The network 10 is installed to enable the CID device to communicate with another computer or server. For example, if bar codes are read by a consumer, network 10 can be used to rapidly obtain product, pricing and coupon data to facilitate the shopping experience. The network 10 generally comprises a host computer 12 and a wireless local area network (not shown) including a plurality of access points (not shown).

The CID device 50 is typically mountable to a shopping cart, but may be handheld and portable. The CID device 50 includes a housing 14 that is preferably made of metal, high strength plastic, or the like. Attached to, or formed as part of, the housing 14 may be mounting means or a docking station (not shown) for stabilizing the housing onto the shopping cart. It will be appreciated that the CID device 50 may be mounted in any of a variety of manners suitable for preventing dislodgement of the CID device 50 from a desired location. The housing 14 is adapted for easy disassembly to accommodate repair and replacement of parts.

The CID device 50 includes a display screen 16. The display screen 16 functions to display data or other information relating to ordinary operation of the CID device 50. For example, software operating on the CID device 50 may provide for displaying pricing information, inventory information, etc. to a user on display screen 16. Additionally, the display screen 16 may display a variety of functions that are executable by the CID device 50. In a preferred embodiment, the display screen 16 displays graphics based alphanumerical information, such as, for example, the price of a product. The display screen can also display images relating to the products sold or offered to the consumer, to potential uses of those products in, for example, recipes for food products, and to the use of the CID itself or within the overall setting in which the consumer is using it.

The display screen 16 also provides for the display of graphics such as icons representative of particular products. The display screen 16 is controlled by electronic circuitry within the CID device 50. Moreover, information, images, icons, and messages related to the products may be regularly changed or updated at intervals to correspond to new advertising campaigns. Such display screen 16 may be used in connection with a centralized location that will transmit updated advertisements to, say, for example, all the shopping carts in the store via an antenna 22 located in the housing 14 of each of the CID devices 50. Such communications with the CID device 50 on a shopping cart may be by means of radio frequency transmissions. The display screen 16 may have a touch sensitive surface and can function both as a video display and a data input device. Said touch sensitive surface may be sensitive to the touch of a human finger or a touch sensitive compatible stylus (not shown) may also be provided with the CID device 50.

The CID device 50 may also include an off button 18 for turning off the display screen 16, an on button 20 for turning on the display screen 16, a speaker 26 for providing audible information to the consumer, an optional printer system 24 disposed within the housing 14 for discharging printed paper, and an antenna 22 for wirelessly communicating information with an radio frequency (RF) access point (not shown) or other means to connect with the network 10. The network 10 may be an Internet network or an internal Intranet or any other type of network.

The CID device 50 may further include, or be associated with, a bar code scanner (not shown) so that product prices may be acquired by scanning bar codes. The display screen 16 would then report the information to the consumer. The display screen 16 may include a means for totaling the prices of all the purchases that the consumer wishes to make and then provide an output of the total on the display screen 16.

The CID device 50 may further have a separate provision for reading magnetic stripe information (e.g., that contained on a debit card, a credit card, a bank ATM card or any such card having a readable stripe) to enable the CID device 50 to thereby verify the identity of the consumer and may debit the cost of those goods from the consumer's account as he/she is checking out. The consumer could then insert or swipe the card across the reader and the unit would then identify the user's account and may be used to debit his account in order for the consumer to pay for his goods.

However, all this functionality provided by the CID device 50 is useless if a child tampers with the display screen 16, buttons 18 and 20, or the scanner, and, for instance, deletes some or all the data input by the consumer and/or all the data provided by the store to the user. Therefore, the exemplary embodiments provide for a CID device 50 that ignores all inputs, except for an unlock means, when it is in child lock mode. The fundamental state of the CID device 50 would not change. However, new information or messages coming from the store to the consumer could be displayed on the display screen 16 while the CID device 50 is in lock mode.

When the CID device 50 is configured or set-up for a consumer initially, the consumer may be asked if the child lock capability is desirable under any circumstances. Some consumers such as, for example, those without children or who never shop with children, may elect to disable the child lock function, rendering it unavailable while shopping. Other consumers such as, for example, those who occasionally shop with children, may elect to enable the child lock function, but configure it to be deactivated or off as the initial state when using the CID device 50. So, for the second consumer group, the child lock function is available, but off initially. A last group of consumers such as, for example, those who frequently shop with children in the child seat of the cart, may elect to enable the child lock function and configure it to be activated or on as the initial state for the CID device 50. So, for these consumers, the child lock is not only available, but always on when using the CID device 50. It is noted that to activate/deactivate a child lock mode means that the lock function is in use to prevent/permit use of the display screen 16 of the CID device 50. In addition, a turn on/turn off lock mode means the same thing as an activate/deactivate child lock mode. It is also noted that the enable/disable child lock mode means that the lock function can be made available or not for use by the consumer while shopping. When initially setting up a shopper profile or configuration that is associated with the use of the CID, the consumer could be given the option of having the child lock disabled (or OFF as the default) or having the child lock enabled (or ON as the default). It is assumed that consumers without children would normally disable the child lock because it would be unnecessary. In an alternative embodiment, these states could be referred to as having the lock function configured to ON or OFF.

In combination with the configuration settings for a given consumer or, possibly, independent of them, the child lock may be implemented with a switch 28 mounted on the bottom edge of the CID device 50, where it is more difficult for the child to gain access. The switch 28 could be used for either of two purposes. The purpose for switch 28 could be designated by the manufacturer of the CID device 50 or by the provider (that is, the retailer) of the CID device 50 to the consumer. For the first purpose or design, the switch 28 could function to enable or disable the child lock function. So, for one position or state of the switch 28, the child lock function would be disabled or unavailable to the consumer. When the switch 28 is toggled or placed in its alternate state, the child lock function would be enabled or available. Alternately, for the second purpose or design, switch 28 could function to toggle the child lock mode on or off. The switch 28 may be mounted on any position or location of the display screen 16 or housing 14. The switch 28 may be located on a top portion, on a bottom portion, or on a side portion of the display screen 16. The child lock switch 28 may also be located on the docking station on the shopping cart to which the CID device 50 is mounted. Also, the lock switch 28 may not be a switch, but instead, a push button, or any other means of enabling or disabling the child lock function with regard to the display screen 16. Lock switch 28 may be recessed into housing 14 to further limit access by the child.

When the child lock function is enabled or available in the CID device 50, the consumer should have information about the activation status of the child lock; that is, whether it is on or off, and the ability to change the activation status. The CID device 50 may provide for a visual and an audible indication that it is in the child lock mode.

There are several other methods by which to activate (that is, turn on) and deactivate (that is, turn off) the child lock mode. One method is by pushing two of the existing physical buttons 18 and 20 at the same time in order to toggle the child lock mode on and off. To avoid completely powering off the CID, the power off function could be designed to require the power off button to be held for a significant amount of time. Physical buttons are used because the touch screen capability of the display screen 16 does not usually respond accurately when touched in two different places such as, for example, two different virtual buttons, simultaneously.

Another method to toggle the child lock mode on and off is by swiping a designated card in a MSR (Magnetic Stripe Reader). Furthermore, scanning a special bar code could be used to toggle the child lock mode on and off. The bar code could be mounted on the CID device 50 if the scanner is removable from the CID device 50, or the bar code could be secured to the CID device 50 with a tether if the scanner is integrated into the device.

Also, pushing a button or combination of buttons on the scanner could be used to toggle the child lock mode on and off. Another method involves simply removing or replacing the hand held scanner from or to the CID device 50 as an alternative means of activating or deactivating the child lock. Another method for activating the child lock involves using a password. However, the use of a password may be cumbersome, and, with the touch capability disabled on the display screen 16, a button activation or other action with a physical component of the CID device 50 would be required to turn off the child lock. Entering a multiple digit password would take longer than flipping a switch or employing one of the alternative methods described.

While shopping, the consumer user who has elected to have the child lock capability always on or active would also be provided with a means of momentarily suspending the child lock mode. This mode would require the user to provide a second input to or take a supplemental action with the CID device 50 at the same time that normal information is input into the device. Otherwise the CID device 50 would not accept consumer user input. Said second input or supplemental action could be via holding down a button or blocking ambient or other light from reaching a photo sensor on the CID, or other means. The momentarily suspended child lock mode could be initiated via a configuration screen, information associated with the user's identification or frequent shopper number, a password, swiping a special magnetic stripe, scanning a special bar code, or other means.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The implementation means described herein are just examples. There may be many variations to these implementation means or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for providing consumer information, the system comprising:
a network;
a host system in communication with the network;
a consumer information device (CID), the CID including:
   a display;
   a docking station for mounting the CID to a shopping cart;
   an antenna for communicating with the network;
   a bar code scanner;
   a child lock disabling inputs to the CID when the child lock is activated, the CID receiving messages from the network when the child lock is activated and displaying messages on the display when the child lock is activated;
   the child lock having a first mode in which the child lock is disabled, a second mode in which the child lock is initially deactivated and a third mode in which the child lock is initially activated, the first, second or third mode being selected in response to a shopper profile, the shopper profile being configured when a consumer initially uses the CID;
   a locking mechanism for permitting a user to activate or deactivate the child lock.

2. The system of claim 1, wherein scanning a bar code with the bar code scanner activates the locking mechanism.

3. The system of claim 1, wherein:
the CID includes a secondary input for momentarily suspending the child lock when the child lock is activated, the secondary input allowing a user to interact with the CID.

* * * * *